Patented Nov. 14, 1950

2,529,865

UNITED STATES PATENT OFFICE 2,529,865

PYRIDYLALKYL ESTERS OF AROMATIC SUBSTITUTED ACETIC ACIDS

Robert R. Burtner, Skokie, and John M. Brown, Chicago, Ill., assignors to G. D. Searle & Co., Skokie, Ill., a corporation of Illinois No Drawing. Application April 5, 1947, Serial No. 739,644

13 Claims. (Cl. 260—295)

This invention relates to pyridylalkyl esters of diarylacetic acids. In particular it relates to pyridylalkyl esters of aromatic substituted acetic acids having the general formula:

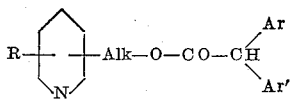

wherein Alk represents a lower alkylene radical such as methylene, ethylene, propylene, trimethylene and the butylene radicals, Ar and Ar' represent simple aryl radicals such as phenyl, tolyl, halophenyl, anisyl, naphthyl, xenyl and the like, and R represents hydrogen or lower alkyl. Ar and Ar' together can form an arylene radical such as the o-biphenylene radical, which together with the CH grouping comprises a 9-fluorenyl radical. Other arylene radicals which are within the purview of this invention include those, which together with the CH group, make up 9-xanthyl, 10-thioxanthyl and 9,10-dihydro-9-anthryl radicals. As used herein, diaryl is meant to include two aryl radicals or one arylene radical.

Among the substances which make up our invention are the following:

(A) 2-(alpha-methyl-beta-pyridyl)ethyl diphenylacetate, which has the formula

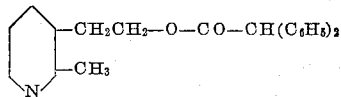

(B) 2-(beta-methyl-alpha-pyridyl)ethyl fluorene-9-carboxylate, which has the formula

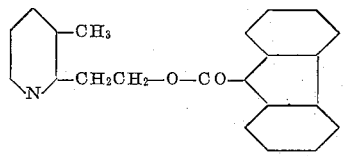

(C) 1-(alpha-pyridyl)-2-propyl phenylxenyl-acetate, of the formula

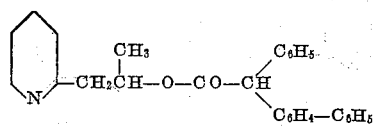

(D) 1-(gamma-pyridyl)-2-propyl thioxanthene-10-carboxylate, having the formula

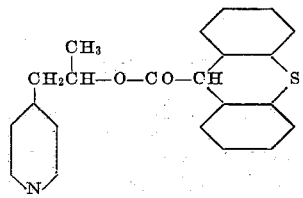

(E) Gamma-pyridylmethyl 9,10-dihydroanthracene-9-carboxylate, which has the formula

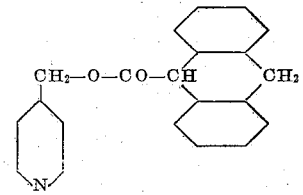

(F) Beta-pyridylmethyl diphenylacetate, having the formula

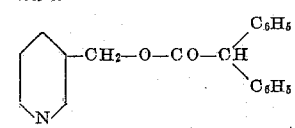

These esters are synthesized from the corresponding pyridylalkanols and the diarylacetyl chlorides, as illustrated in the examples.

The compounds which comprise this invention are useful in therapeutics, particularly as antispasmodic agents. Among the preferred compositions is 2-(alpha-pyridyl)ethyl diphenylacetate hydrochloride. The esters are prepared by esterifying a pyridylalkanol with a diarylacetic acid or preferably with a diarylacetyl chloride. The amino esters readily form salts with common inorganic and organic acids, and these salts are generally readily water-soluble. Among the acids which are suitable for this purpose are hydrochloric, hydrobromic, sulfuric, phosphoric, citric, tartaric and other similar acids which provide non-toxic anions. These salts are generally crystalline solids having the same therapeutic properties as the bases from which they are derived and constitute a preferred form of these compounds. It will be understood that the appended claims include the free basic esters as well as the salts thereof.

The following examples further illustrate the invention, but in no way limit it in scope.

Example 1

13.7 g. of 1-(alpha-pyridyl)-2-propanol and 23 g. of diphenylacetyl chloride in 150 ml. of benzene are refluxed with stirring for five hours. The reaction mixture is cooled, poured into 200 ml. of water containing 8 g. of sodium hydroxide, mixed and separated. The organic layer is washed with water, dried with anhydrous sodium sulfate, and evaporated. The residue of oily ester base is dissolved in 300 ml. of anhydrous ether, treated with one equivalent of absolute alcoholic hydrogen chloride, and stored in a refrigerator until crystallization is complete. The crystals of 1-(alpha-pyridyl)-2-propyl diphenyl-acetate hydrochloride are removed by filtration, washed with ether, recrystallized, first from methyl ethyl ketone and finally from ethyl acetate, and melt at 114° C. This ester has the formula

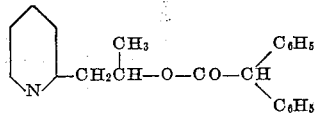

Example 2

A mixture of 21 g. of fluorene-9-carboxylic acid, 30 g. of thionyl chloride and 65 ml. of dry carbon tetrachloride is refluxed for one and one-half hours, during which time complete solution is effected. Solvent and excess thionyl chloride are removed on the water bath at 60° C. under water pump vacuum, and the semi-solid residue is immediately dissolved in 50 ml. of dry benzene.

To this solution of the crude fluorene-9-carboxylic acid chloride is added a solution of 13.7 g. of 1-(alpha-pyridyl)-2-propanol in 50 ml. of benzene, and the resulting mixture is heated for three and one-half hours on the steam bath. The mixture is then made alkaline by shaking with a solution of 8 g. of sodium hydroxide in 100 ml. of water, whereupon the reaction product is dissolved. The benzene layer is separated and the aqueous raffinate extracted with 100 ml. of fresh benzene. The combined benzene extracts are then worked up as above to give the brown oily basic ester. The ester is taken up in 400 ml. of dry ether; and a small amount of insoluble material is filtered out, treating with charcoal in process. Addition of one equivalent of absolute alcoholic hydrogen chloride precipitates the hydrochloride as a viscous, semi-solid material which fails to crystallize even after four weeks.

Reprecipitation of the base with 10% sodium carbonate solution gives 19.5 g. of an orange viscous oil, which is dissolved in 300 ml. of dry ether and treated with absolute alcoholic hydrogen chloride as above. The hydrochloride again comes down in semi-solid form. The white semi-solid product is thereupon washed repeatedly by decantation with fresh dry ether and dried in vacuo over sodium hydroxide to give 1-(alpha-pyridyl)-2-propyl fluorene-9-carboxylate hydrochloride as a colorless amorphous solid. Hygroscopicity is too great for melting point determination. Analysis of a sample of this ester hydrochloride showed 3.75% N (calculated, 3.83% N). This ester has the formula

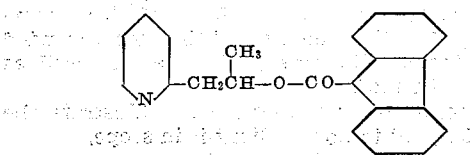

Example 3

To a solution of 25.3 g. of diphenylacetyl chloride in 50 ml. of dry benzene is added a solution of 12.3 g. of 1-(gamma-pyridyl)-2-ethanol plus 19.6 g. of N-ethylmorpholine in 50 ml. of benzene. The resulting mixture is heated on the steam bath for five hours. Following the heating period, 100 ml. more benzene is added and the mixture is made alkaline by shaking with a solution of 8 g. of sodium hydroxide in 100 ml. of water. A small amount (less than 3.0 g.) of tar is found and discarded. The benzene layer is separated and the aqueous raffinate extracted with 100 ml. of fresh benzene. The combined benzene extracts are then worked up as above to give the red-brown oily ester.

Solution of the ester in dry ether, treatment with charcoal, filtration and precipitation with absolute alcoholic hydrochloric acid in the usual way give an orange-brown semi-solid hydrochloride which fails to crystallize after three days. The plastic mass is washed repeatedly by decantation with fresh dry ether and dried in vacuo over sodium hydroxide to give 2-(gamma-pyridyl)-ethyl diphenylacetate hydrochloride as a tan amorphous solid. Hygroscopicity is too great for melting point determination. Analysis of a sample of the hydrochloride showed 4.40% N (calculated, 3.96% N). This ester has the formula

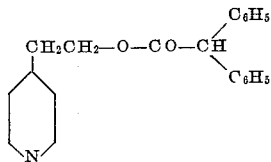

Example 4

A mixture of 22.4 g. of 9,10-dihydroanthracene-9-carboxylic acid, 30 g. of thionyl chloride, and 75 ml. of carbon tetrachloride is refluxed for 2 hours. Then excess thionyl chloride and carbon tetrachloride are removed in vacuo at 60° C. The semi-solid 9,10-dihydroanthracene-9-carboxylic acid chloride is taken up in 50 ml. of dry benzene and treated with a solution of 13.7 g. of 2-(alpha-pyridyl)ethanol in 50 ml. of benzene. The resulting mixture is refluxed for 3½ hours on the steam bath. A solution of 8 g. of sodium hydroxide in 100 ml. of water is mixed in and the benzene layer is separated. The aqueous layer is extracted with benzene and the extract is combined with the benzene layer. The resulting benzene solution is washed with water, dried with sodium sulfate, and evaporated at 60° C. under reduced pressure. The residue of 2-(alpha-pyridyl)ethyl 9,10-dihydroanthracene-9-carboxylate is converted to its hydrochloride, M. P. 169° C., by solution in dry ether and treatment with one equivalent absolute alcoholic hydrogen chloride. This ester has the formula

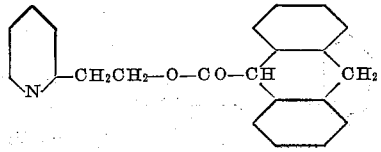

Example 5

By following the methods of the above examples there can be prepared the following esters and their hydrochlorides:

| Ester | M. P. of Hydro-chloride, °C. | Per Cent Nitrogen | |
|---|---|---|---|
| | | Calcd. | Found |
| 2-(alpha-Pyridyl) ethyl diphenylacetate | 83–85 | | |
| 2-(alpha-Pyridyl) ethyl fluorene-9-carboxylate | | 3.98 | 3.52 |
| 3-(alpha-Pyridyl)-1-propyl diphenylacetate | 96–98 | | |
| 3-(alpha-Pyridyl)-1-propyl fluorene-9-carboxylate | | 3.83 | 3.74 |
| 2-(gamma-Pyridyl) ethyl fluorene-9-carboxylate | | 3.98 | 4.02 |
| 3-(gamma-Pyridyl)-1-propyl fluorene-9-carboxylate | 150–152 | | |
| 3-(gamma-Pyridyl)-1-propyl diphenylacetate | 153–155 | | |
| 2-(alpha-Pyridyl) ethyl xanthene-9-carboxylate | 162–163 | | |

We claim:

1. A member of the group consisting of a pyridylalkyl ester of a di-aromatically substituted acetic acid, which has the formula

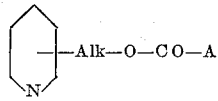

wherein Alk is a lower alkylene radical and A is a member of the group consisting of diarylmethyl, 9-fluorenyl, 9,10-dihydro-9-anthryl and 9-xanthyl radicals, and salts thereof.

2. A salt of a pyridylalkyl fluorene-9-carboxylate, which has the formula

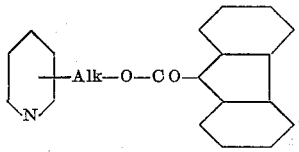

wherein Alk is a lower alkylene radical.

3. A salt of a pyridylalkyl diphenylacetate, which has the formula

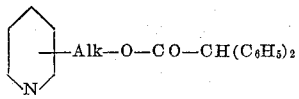

wherein Alk is a lower alkylene radical.

4. A salt of a pyridylpropyl fluorene-9-carboxylate, which has the formula

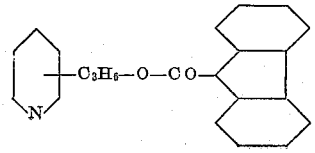

5. A salt of a pyridylethyl diphenylacetate, which has the formula

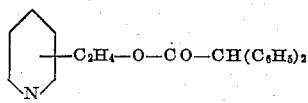

6. A salt of a 2-(alpha-pyridyl) ethyl diphenylacetate, which has the formula

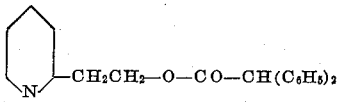

7. A salt of a 1-(alpha-pyridyl)-2-propyl fluorene-9-carboxylate, which has the formula

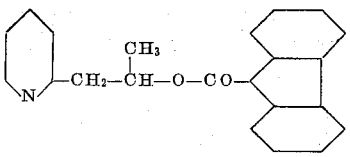

8. A salt of a pyridylalkyl 9,10-dihydroanthracene-9-carboxylate, which has the formula

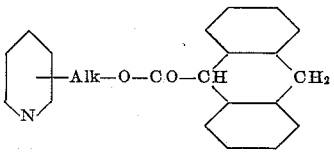

wherein Alk is a lower alkylene radical.

9. A salt of a pyridylethyl 9,10-dihydroanthracene-9-carboxylate, which has the formula

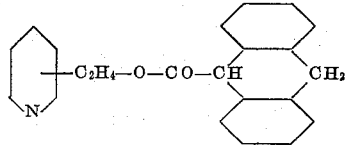

10. A salt of a 2-(alpha-pyridyl) ethyl 9,10-dihydroanthracene-9-carboxylate.

11. 2-(alpha-pyridyl) ethyl 9,10-dihydroanthracene-9-carboxylate hydrochloride.

12. 2-(alpha-pyridyl) ethyl diphenylacetate hydrochloride.

13. 1-(alpha-pyridyl)-2-propyl fluorene-9-carboxylate hydrochloride.

ROBERT R. BURTNER.
JOHN M. BROWN.

REFERENCES CITED

The following references are of record in the file of this patent:

Weislogle—Survey of Antimalarial Compounds, vol. 2, part 2, page 996 (1946).